United States Patent [19]

Schwarz

[11] Patent Number: 4,730,641
[45] Date of Patent: Mar. 15, 1988

[54] ROTATIONAL DOBBY

[75] Inventor: Rudolf Schwarz, Horgen-Zuerich, Switzerland

[73] Assignee: Staeubli Ltd., Horgen-Zuerich, Switzerland

[21] Appl. No.: 808,411

[22] Filed: Dec. 12, 1985

[30] Foreign Application Priority Data

Dec. 18, 1984 [EP] European Pat. Off. ........ 84115669.8

[51] Int. Cl.⁴ .................... D03C 1/00; G05G 1/00; F16D 11/06
[52] U.S. Cl. ...................................... 139/76; 74/570; 192/28
[58] Field of Search ............... 139/66 R, 66 A, 76; 74/84 R, 112, 116, 570; 192/28, 71, 29

[56] References Cited

U.S. PATENT DOCUMENTS

| 679,244 | 7/1901 | Simpkins | 74/84 |
|---|---|---|---|
| 3,016,252 | 1/1962 | Mitchell | 192/71 |
| 3,180,366 | 4/1965 | Hoenig | 139/66 R |
| 3,568,724 | 3/1971 | Xaus | 139/66 R |
| 3,726,323 | 4/1973 | Kleiner | 139/66 R |
| 3,812,730 | 5/1974 | Yanagawa | 74/112 |
| 4,354,531 | 10/1982 | Surkamp et al. | 139/66 R |
| 4,362,188 | 12/1982 | Surkamp et al. | 139/76 |
| 4,493,346 | 1/1985 | Speich | 139/76 |
| 4,542,769 | 9/1985 | Jülich | 139/66 R |
| 4,572,013 | 2/1986 | Kasukave | 74/84 |
| 4,597,417 | 7/1986 | Schwarz | 139/76 |
| 4,614,211 | 9/1986 | Mettler | 139/76 |

FOREIGN PATENT DOCUMENTS

| 0151655 | 8/1985 | European Pat. Off. | 139/76 |
|---|---|---|---|
| 1535258 | 1/1971 | Fed. Rep. of Germany . | |
| 2001027 | 7/1971 | Fed. Rep. of Germany | 139/76 |
| 2909131 | 9/1980 | Fed. Rep. of Germany | 139/76 |
| 1201358 | 12/1959 | France | 139/66 R |
| 1348879 | 12/1963 | France | 139/66 R |
| 1305638 | of 1966 | France | 139/66 R |
| 473253 | 7/1969 | Switzerland . | |
| 245308 | 1/1926 | United Kingdom | 139/66 R |
| 1089821 | 11/1967 | United Kingdom . | |

Primary Examiner—Harvey C. Hornsby
Assistant Examiner—Joseph S. Machuga
Attorney, Agent, or Firm—Flynn, Thiel, Boutell & Tanis

[57] ABSTRACT

A driving coupling includes two pawls which are supported pivotally on an eccentric ring and which in a patternlike manner engage a longitudinal groove in the drive shaft. Each of two plates of a toggle-lever joint engages an arm extension of a respective pawl, the swivel axle of the toggle-lever joint being guided in a control groove of a swinging switching arm. When the pawls are engaged with a drive shaft groove, the toggle-lever joint is in an extended position which locks the pawls in position. For unlocking the pawls, the switching arm moves the toggle-lever joint into a catch opening between two guide rails. The pawls swing out and the drive shaft rotates without carrying along the pawls and the eccentric ring.

16 Claims, 8 Drawing Figures 4,730,641

ROTATIONAL DOBBY

FIELD OF THE INVENTION

This invention relates to a driving coupling for a rotationally driven dobby and, more particularly, to such a driving coupling which includes an eccentric ring supported freely rotatably on a drive shaft for controlling a heddle frame of a weaving machine, a connecting rod freely rotatably supported on the eccentric ring, a pivotally supported controlling switching arm having an indexing ring with a controlling cam, which indexing ring is approximately concentric with respect to the drive shaft and can be swung back and forth with respect to and in a radial plane of the drive shaft, and two pawls which can engage the same groove in the drive shaft and are each supported swingably on the eccentric ring, wherein one pawl is a driving pawl which serves to take along the eccentric ring with the shaft and the other pawl serves to hold back the eccentric ring so as to maintain the driving pawl in play-free engagement in the groove of the drive shaft.

BACKGROUND OF THE INVENTION

Such rotational dobbies have become well-known both in technical literature and also in reality, wherein for the coupling, different radially movable and controlled driving keys which can engage a groove of the drive shaft have been provided, for example as disclosed in U.S. Pat. No. 3 180 366, German Pat. No. 1 535 258 and German Offenlegungsschrift No. 30 01 310, and on the other hand pawls have been provided which are supported on the eccentric ring, are controlled in any manner and engage a groove of the drive shaft. Examples of such a driving coupling are for example illustrated and described in Swiss Pat. No. 473 253, German Offenlegungsschrift No. 29 09 131 and French Pat. No. 1 201 358.

In all of the aforementioned conventional rotational dobbies, the drive shaft rotates intermittently in successive steps of 180°. It is common to effect the control of the coupling during the phase when the drive shaft stands still, wherein such standstill phase in the case of weaving machines which run with a high speed is relatively short or is limited in time. There thus resulted during the development of high-speed rotational dobbies the problem of carrying out the entire control during this limited time or constructing the coupling so that the effective duration for the control, including the reading of the pattern card and also the giving of impulses and safe adjusting of the coupling members, is expanded without limiting the working speed of the connected weaving machines.

It has proven to be disadvantageous to have control mechanisms in which the important controlling function is carried out by a spring, because an instability factor with respect to a constant timely control sequence develops and such mechanism are unreliable when viewed over a long term, which is not the case in mechanical control mechanisms which do not have a spring. During the initial tensioning of springs in anticipatorily controlled arrangements, a considerable reserve force must be produced by the control apparatus, which requires a stronger type of construction of the control apparatus. Finally, it is decisive that the thickness of the coupling elements depends on the width defined by the heddle-frame separation.

Important for the coupling operation is furthermore the safe and certain engagement of the pawls in the groove of the drive shaft. The members for the engaging operation are advantageously tapered at their ends. It is thereby disadvantageous that, during a great load on a wedge or pawl, for example upon a quick shaft start during the intermittent shaft operation, the tapered ends facilitate a pressing of the coupling parts out of the shaft groove. For example, German Offenlegungsschrift No. 30 01 310 shows a locking system which, within the given conditions, is designed short pitched and for this reason does not assure the demanded functional safety.

A further condition which is requested from a modern machine is a universally usable coupling, that is a coupling which operates both during forward and also during reverse operation of the machine. The possibility of turning the shaft or the weaving back for pick finding must be assured in dobbies.

A goal of the invention is thus a driving coupling for rotational dobbies which works in both directions of rotation, which can be anticipatorily controlled without the help of a spring, which effects a play-free coupling, and which has in the coupled condition an automatic self-block. In addition, this coupling is to be able to be installed within the heddle-frame spacing of a weaving machine and is to work error-free at a high speed.

SUMMARY OF THE INVENTION

This is achieved by providing a rotational dobby of the above-mentioned type, in which respective plates of a toggle-lever joint are each pivotally coupled to a respective pawl and the swivel axle of the toggle-lever joint is guided slidably in the controlling cam of the switching arm, wherein to prevent rotation of the pawls and the eccentric ring about the drive shaft in the disengaged condition of the pawls, two stationary catch openings which are diametrically opposed one another are provided for receiving the swivel axle of the togglelever joint when it is in a bent-out position, and wherein the plates of the toggle-lever joint, in the extended condition thereof, serve to block movement of the pawls away from engagement with a groove of the drive shaft.

The connecting of the two pawls, which are arranged in a mirror-image relationship, by a toggle-lever system permits, on one hand, a staggered or simultaneous controlling and engaging thereof and, on the other hand, an automatic blocking in a coupled condition thereof in which the two plates and the joint lie in a straight line, that is, in an extended dead-center position. An anticipatory control is thus possible with a staggered control and engagement.

For controlling and switching the coupling or the toggle joint, a switching arm is arranged approximately concentrically around the drive shaft and is swung back and forth by the reading members of the pattern card. Such switching arms, which have an annular ring or enlargement, have become known through U.S. Pat. No. 3,724,511, U.S. Pat. No. 3,730,231, and U.S. Pat. No. 4,614,211 and have thereon 360° collars or grooves which, according to the invention, are connected to the swivel axle of the toggle joint.

For holding the eccentric ring against rotation when the pawls are disengaged, a part of the swivel axis of the toggle joint is moved into a stationary catch opening formed preferably by ends of two semicircular guide rails which are arranged coaxially around the eccentric ring on the connecting rod. These can be supported resiliently and can additionally hold the toggle joint in its locked condition during its rotational movement with the engaged pawls and the eccentric ring.

BRIEF DESCRIPTION OF THE DRAWINGS

Two exemplary embodiments of the invention are illustrated in the drawings, in which.

DETAILED DESCRIPTION

Figure 1:
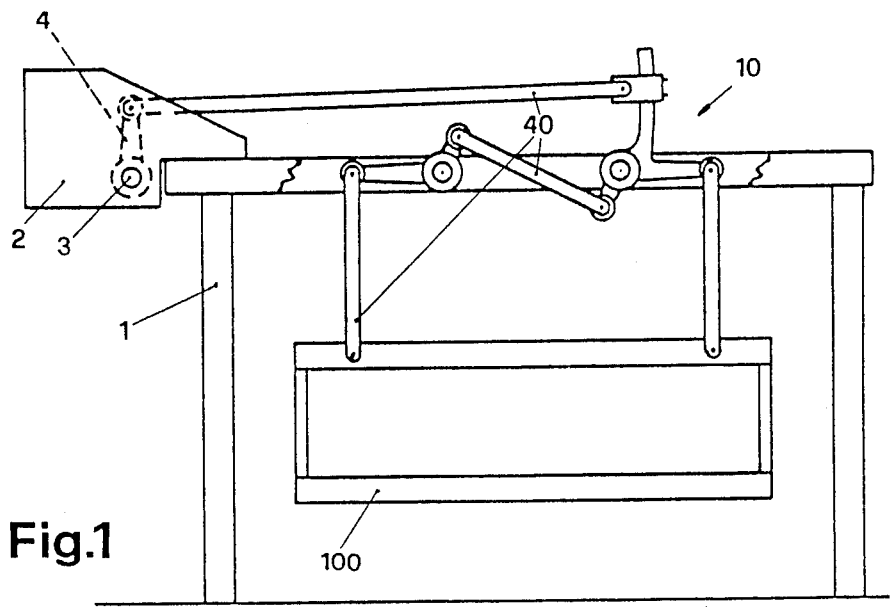
FIG. 1 diagrammatically illustrates a lift unit of a dobby which is connected to a weaving machine and which works according to the principle of the rotational drive.

In FIG. 1, a dobby 2 is secured on the frame 1 of a weaving machine 10, and the drive shaft 3 of the dobby 2, through an eccentric ring which is not illustrated in FIG. 1, movably supports a connecting rod 4 which, through a linkage 40, effects movement of a heddle frame 100.

Figure 2:
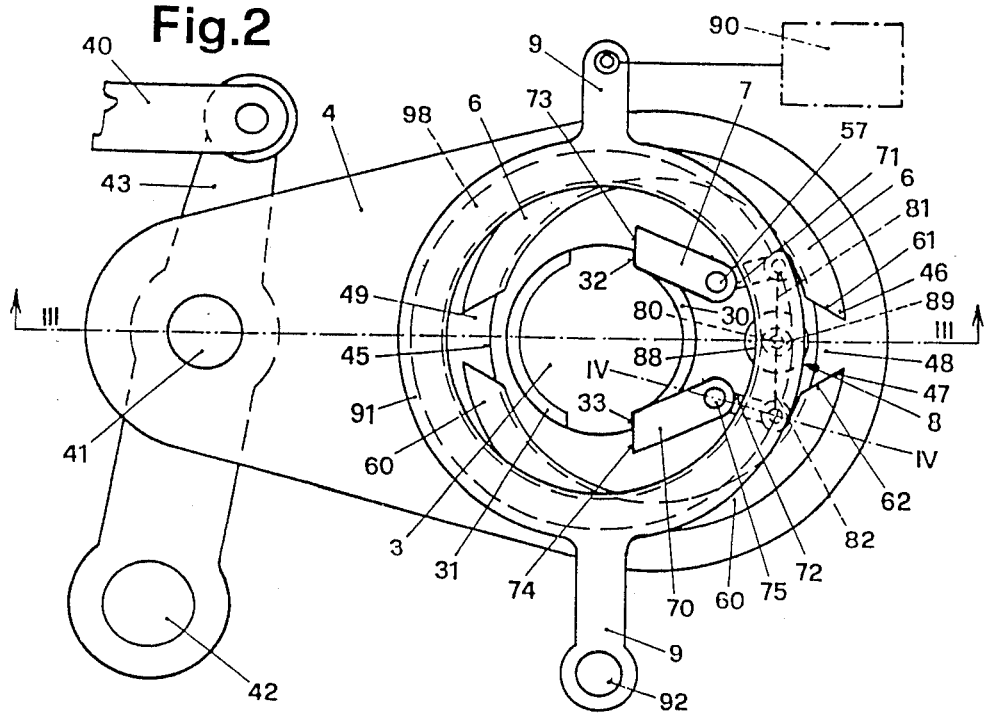
FIG. 2 is a side view of an inventive rotational lift unit in an engaged condition.
Figure 3:
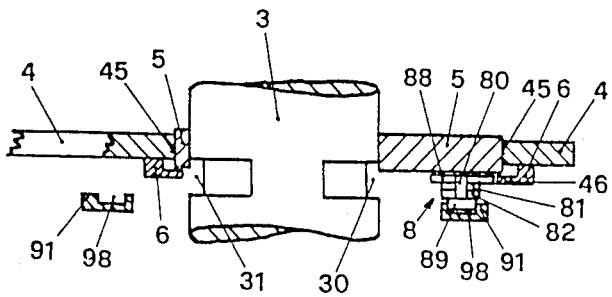
FIG. 3 is a cross-sectional view taken along the line III—III in FIG. 2.
Figure 4:
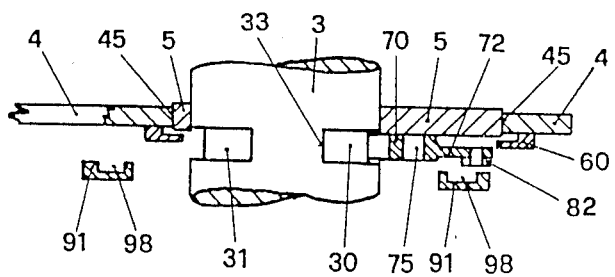
FIG. 4 is a cross-sectional view similar to FIG. 3 but showing a different operational position.

Referring to FIG. 2, the eccentric ring 5 is freely rotataly but axially nonmovably supported in a bore or bearing opening 45 through the connecting rod 4, and is rotatably supported on the intermittently rotating drive shaft 3, which has two longitudinal grooves 30 and 31 arranged diametrically opposite one another.

The movement of the connecting rod 4 is transmitted by a bolt or pin 41 to a driving arm 43 which is pivotally supported on a stationary pin 42 and which is pivotally coupled at a location spaced radially from the pin 42 to the linkage 40 which moves the heddle frame of the weaving machine.

Two pawls 7 and 70 have arm extensions 71 and 72 that make them two-arm levers which are swingably supported on the ring 5 by two pins 57 and 75 which extend parallel to the shaft 3. Depending on the control, the free ends 73 and 74 of the pawls can engage the grooves 30 or 31 in the drive shaft 3. Plates 81 and 82 of a toggle-lever joint 8 are pivotally coupled to a respective one of the arm extensions 71 and 72, and are pivotally coupled to each other by a swivel axle 80 which forms the swivel axis of the toggle-lever joint.

To control the coupling, or rather the toggle-lever joint, a switching arm 9 is supported swingably with respect to and in a radial plane of the drive shaft 3 on a housing-fixed or stationary bolt 92, and movement of the switching arm 9 is effected by a conventional control system 90 which preferably includes a not-illustrated and conventional pattern card. The switching arm 9 has in its center region an annular enlargement or ring 91, through which the drive shaft 3 of the dobby extends. The ring 91 of the switching arm 9 has in the side thereof facing the eccentric ring 5 an annular guide groove 98, which is also called a controlling cam, or alternatively a 360° collar similar to that disclosed in U.S. Pat. No. 3,730,231, the disclosure of which is hereby incorporated herein by reference. The guide groove 98 is operatively coupled to the swivel axle 80 of the toggle-lever joint 8 and controls the driving coupling by means of a member or roller 89 which slides or rolls in the groove 98 and, in the exemplary embodiment, is supported on the swivel axle 80.

In the preferred embodiment of FIG. 2, two arcuate guide rails 6 and 60 are fixedly secured on the connecting rod 4 in a diametrically opposed relationship so as to be adjacent to and concentric with respect to the opening 45 in the connecting rod 4. The guide rails 6 and 60 have adjacent ends 46 and 47 which serve as blocks having a gap or catch opening 48 between them, and a gap 49 is provided between the other ends of the guide rails 6 and 60. If desired, the rails 6 and 60 can be resiliently supported to yieldably permit a small amount of radially outward movement in a manner similar to that disclosed in U.S. Pat. No. 3,724,511, the disclosure of which is hereby incorporated herein by reference.

Figure 5:
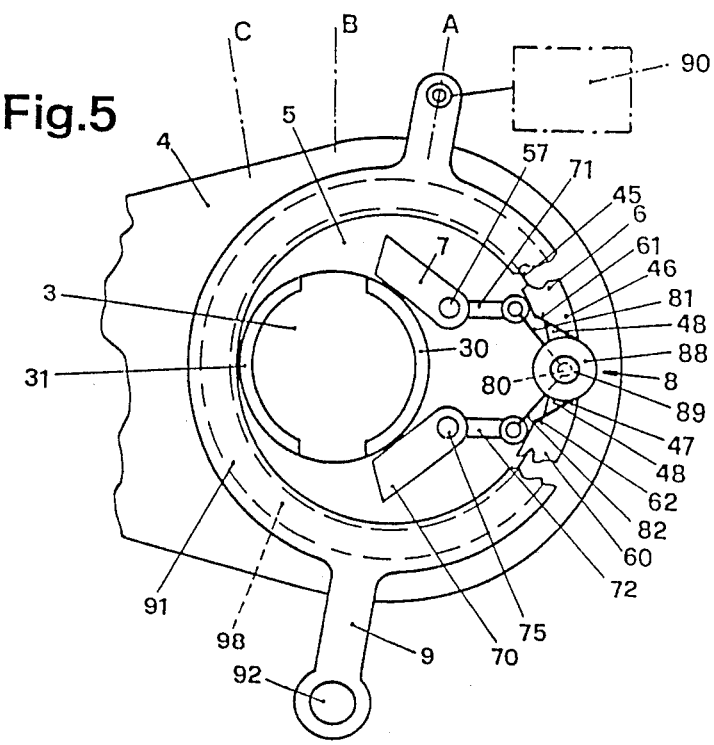
FIG. 5 is a side view similar to FIG. 2 showing the lift unit of FIG. 2 in a disengaged condition.

Starting out from the engaged position of the driving coupling according to FIG. 2, in which the pawls 7 and 70 engage the groove 30 in the drive shaft 3 during or approximately during a standstill of the drive shaft 3, the switching arm 9 can be moved to the right to the position according to FIG. 5. The swivel axle 80 and thus the pivot joint of the toggle-lever joint 8 are thereby moved radially outwardly into the catch opening 48 between the two blocks 46 and 47, which results in a bending of the toggle-lever joint. The two arm extensions 71 and 72 are thereby pivoted toward one another by the two plates 81 and 82 of the toggle-lever joint, thereby causing the pawls 7 and 70 to be swung outwardly out of the groove 30 to the position according to FIG. 5. A disk 88, which can engage the blocks 46 and 47 to effect a catching of the toggle-lever joint 8 in the catch opening 48, is provided on the swivel axis 80. In FIG. 5, the drive shaft 3 rotates without taking along or in other words effecting rotation of the eccentric ring 5. The toggle-lever joint remains caught in the catch opening. The toggle-lever joint 8, the pawls 7 and 70, and the eccentric ring 5 remain at a standstill in the positions shown in FIG. 5, which in turn holds the heddle frame stationary.

Figure 6:
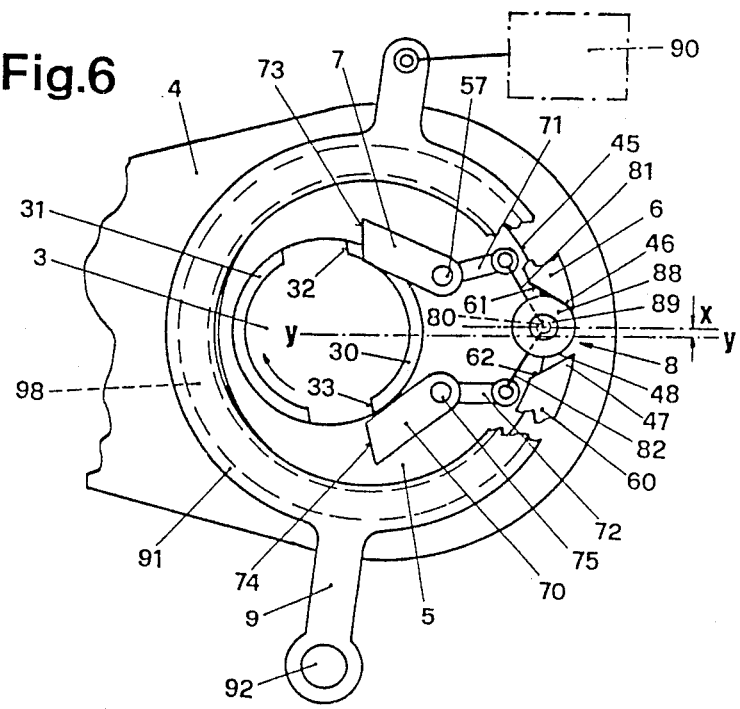
FIG. 6 is a similar view of the lift unit in a position between its engaged and disengaged conditions.
Figure 7:
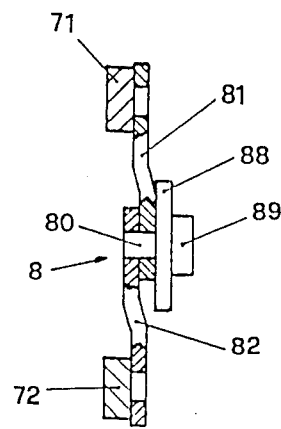
FIG. 7 is a longitudinal cross-sectional view of a toggle-lever joint which is in an extended position and which is a component of the lift unit of FIG. 2.

If a positional change of the heddle frame is now supposed to occur in response to the pattern card and under control of the control system 90, the switching arm 9 is pivoted by the system 90, shortly before reaching a standstill of the drive shaft, from the position A of FIG. 5 toward the position B, and cooperation of its guide groove 98 wit h the roller 89 causes the swivel axle 80 to be moved into the position according to FIG. 6. Since the groove 30 in the drive shaft 3 is already angularly aligned with the upper pawl 7, the pawl 7 can engage the groove 30, while the lower pawl 70 still rests on the drive shaft 3. In order to assume this asymmetrical position, the swivel axle 80 moves away from the normal symmetry axis Y of the toggle-lever joint 8 by a distance X. Upon further rotation of the drive shaft, the pawl 7 is taken along rotationally by the edge 32 of the groove 30. The pawl 70 moves into engagement with the groove 30 and thus prevents play in the coupling. Upon reaching this position, the switching arm 9 can swing the rest of the way to position B (FIG. 5), so that the mechanism is in the position according to FIG. 2. The two plates 81 and 82 of the toggle-lever joint thus move to an extended position in which they form a straight line and produce a toggle effect which blocks pivotal movement of the pawls 7 and 70 about pins 57 and 75. The eccentric ring 5 is taken along rotationally by the pawls 7 and 70 due to the bearing pins 57 and 75 which are secured to the ring 5. The member or roller 89 slides or rolls in the guide groove 98, and the entire toggle-joint mechanism rotates 180° along with the ring 5 to the next standstill position of the drive shaft 3, and carries out further 180° movements until the next control movement of the switching arm 9 occurs. The heddle frame 100 of the weaving machine 1 is moved between its upper and lower positions by the connecting rod 4 and the linkage 40 as the ring 5 rotates.

For releasing the coupling between the ring 5 and shaft 3, the switching arm 9 is moved by the system 90, during or approximately during a standstill of the drive shaft 3, from position B (FIG. 5) into one of the positions A and C (FIG. 5), as appropriate. The groove 98 in the ring 91 of the arm 9 thus moves the roller 89 and axle 80 radially outwardly, causing the automatic block of the toggle-lever joint to be released and the pawls 7 and 70 to move out of the groove in the drive shaft.

The described switching operations, which are effected by movement of the switching arm 9 between three positions, can occur both in the region of the right catch opening 48 and also in the region of the left catch opening 49. The right catch opening 48 receives the disk 88 during movement of the arm 9 from the position B into the position A, and the left catch opening 49 receives the disk 88 during movement of the arm 9 from the position B into the position C.

The free ends 73 and 74 of the pawls 7 and 70, and also the edges 32 and 33 of the grooves 30 and 31 in the drive shaft 3, are constructed so that, when the driving coupling is engaged (FIG. 2), they are approximately parallel to a line which extends between the two swivel points 57 and 75 of the pawls, and the pawls in the position of FIG. 2 extend approximately tangentially with respect to the outer surface of the drive shaft. This results in a troublefree engagement of the pawls and ensures, during the fast starting of the drive shaft after a standstill and the associated flank pressure applied to the locking surfaces 73 and 74, that the pawls are not moved out of the shaft groove, the engaging surfaces of the pawl ends 73 and 74 and groove edges 32 and 33 being held against relative movement by friction.

Figure 8:
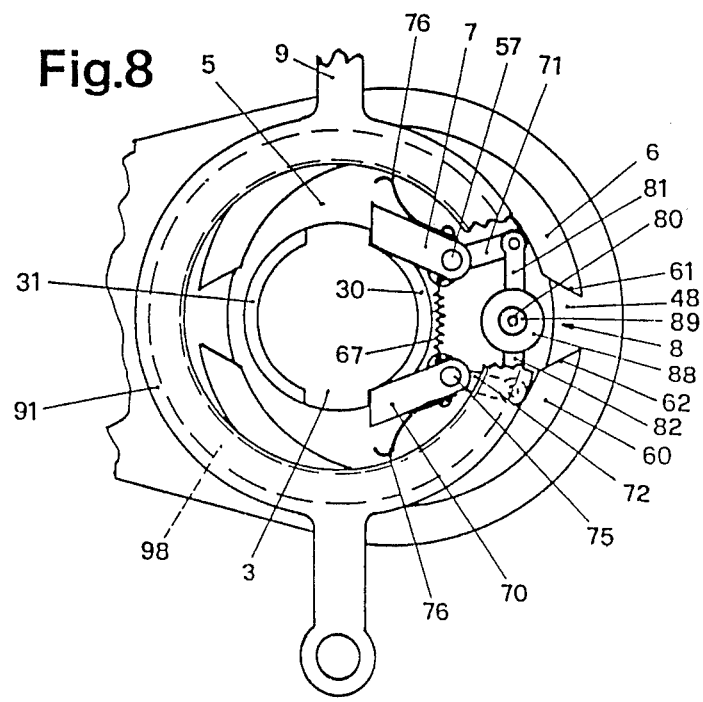
FIG. 8 is a view similar to FIG. 2 of a modified embodiment of the rotational lift unit of FIG. 2.

FIG. 8 shows a double modification of an inventive rotational lift unit. The pawls 7 and 70 are in engagement with the groove 30 in the drive shaft, so that the eccentric ring 5 carries out a rotary movement of 180° with the drive shaft. All elements correspond with those of FIG. 2. In addition, as a supplement, two spring arrangements are provided, namely a single tension spring 67 which pulls the two pawls 7 and 70 pivotally toward one another and two leaf springs 76 which are each secured on a respective pawl 7 or 70 and which each have an end which extends into the space between the drive shaft and indexing ring and which, in the engaged condition of the pawls, is spaced a small distance from the inner circumference of the indexing ring 91 so that, during rotation of the eccentric ring 5 and the pawls 7 and 70 with the drive shaft 3, friction does not occur between the springs 76 and the ring 91. When the pawls are in a disengaged position and the disk 88 of the toggle joint 8 is in one of the catch openings 48 and 49 so that the eccentric ring is held against rotation about the shaft 3, then the free ends of the leaf springs 76 are each supported on the inner circumference of the indexing ring 91 and support through their resilient spring action a subsequent movement of the pawls into engagement with a groove in the drive shaft.

It is expressly pointed out that the springs 67 and 76 do not themselves control the movement of the pawls 7 and 70 and the toggle-lever joint components 71, 81, 80, 72 and 82, but instead only assist or support their controlled movement in certain directions in the sense of a certain acceleration.

It is also emphasized that the springs 67 and 76 achieve essentially the same result, and it is thus possible to provide only the spring 67 or only the springs 76.

The boundary surfaces 61 and 62 which form the catch openings 48 can be provided on two or four blocks or, as explained above, can be provided on blocks 46 and 47 which are the ends of guide rails 6 and 60 which are each semicircular and concentric to the bore 45 in the connecting rod 4 for the eccentric ring 5. The joint of the toggle-lever joint 8 can slide along these guide rails 6 and 60 to provide an additional safety factor against a bending of the toggle-lever joint, wherein the disk 88 on the swivel axis 80 is preferably the part which slidably engages the rails 6 and 60 and can also be a cam on the swivel axle itself or a separate plate. The catch openings 48 and 49 can if desired be arranged on a stationary part of the machine housing instead of on the connecting rod, and have entry widths which are larger than the largest diameter of the joint of the toggle-lever joint, for example larger than the diameter of the disk 88. With this, funnel-shaped catch openings to effect a catching of the toggle joint are assured. Through the already described two-part asymmetrical position of the swivel axle 80 with respect to the catch opening 48 or 49, there results a controllable control path and a play-free support.

The pawls 7 and 70, the toggle-lever joint 8, and the catch openings 48 and 49 preferably lie symmetrically with respect to the radially extending centerline y of the connecting rod 4.

In place of the connecting rod 4, it is possible to provide, for transferring movement of the eccentric ring 5 through the linkage 40 to the heddle frame 100, a roller lever, which can consist of a rocking lever which is arranged on a stationary axle, which on one side engages with a roller the periphery of the eccentric ring, and which on the other side is connected to the linkage 40. The heddle frame, under control of the rocking lever, is moved up and down during the rotation of the eccentric ring. The blocks 46 and 47 of the guide rails 6 and 60 which form the catch openings 48 and 49 are thereby secured on the housing or on the frame of the dobby 2.

The described driving coupling makes possible an anticipatory control of the actual coupling with a controlled forced engagement at the moment of the standstill of the drive shaft. No spring-controlled operations take place, and the individual structural parts are not subjected to wear through friction. The coupling, in spite of this, operates safely and quickly with a simple automatic lock in the coupled position.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a driving coupling between a drive shaft and an eccentric ring of a rotational dobby, the drive shaft having a groove therein and the eccentric ring being supported freely rotatably on the drive shaft for controlling a heddle frame of a weaving maching, wherein a connecting rod has therein an opening in which the eccentric ring is freely rotatably supported and the coupling has a controlling switching arm with an indexing ring having a controlling cam, the indexing ring being approximately concentric with respect to the drive shaft in a first position of said indexing ring and being reciprocally movable with respect to and in a radial plane of the drive shaft between second and third positions, said first position of said indexing ring being intermediate said second and third positions thereof, and including two pawls which can engage the groove of the drive shaft and are each supported on the eccentric ring for pivotal movement about a respective pivot axis, wherein one said pawl is a driving pawl which can effect rotational movement of the eccentric ring in response to rotational movement of the shaft and the other said pawl can hold back the eccentric ring so as to maintain the driving pawl in play-free engagement in the groove of the drive shaft, the improvement comprising a toggle-lever joint which includes two plates and a swivel axle which pivotally couples the plates to each other, wherein the plates of the toggle-lever joint are each pivotally coupled to a respective said pawl, wherein the swivel axel of the toggle-lever joint is movable in directions substantially radially of the drive shaft between first and second positions, wherein as the swivel axle of the toggle-lever joint moves between its first and second positions the plates of the toggle-lever joint move the pawls between positions in which the pawls are respectively engaging and spaced from the drive shaft, wherein the swivel axle of the toggle-lever joint is guided slidably in the controlling cam of the indexing ring, including catch means for preventing rotation of the pawls and the eccentric ring about the drive shaft when the pawls are in the positions spaced from the drive shaft, the catch means including two stationary catch openings which are diametrically opposed to one another and can receive the swivel axle of the toggle-lever joint when the swivel axle is in its second position, and wherein the plates of the toggle-lever joint, when the swivel axle of the toggle-lever joint is in its first position, serve to block movement of the pawls away from engagement with the groove of the drive shaft.

2. A driving coupling of a rotational dobby according to claim 1, wherein the two pawls each have first and second arms which project outwardly from the pivot axis therefor, wherein the first arm of each pawl has an engaging end which is remote from the pivot axis for such pawl and which can engage the groove in the drive shaft, wherein each said plate of the toggle-lever joint is pivotally coupled to the second arm of a respective said pawl in a manner so that the engaging ends of the first arms of the two pawls, during pivoting of the toggle-lever joint, swing away from the drive shaft.

3. A driving coupling of a rotational dobby according to claim 1, wherein a sliding part which engages the controlling cam of the indexing ring is provided on the swivel axle of the toggle-lever joint.

4. A driving coupling of a rotational dobby according to claim 1, wherein the groove in the drive shaft has two edge surfaces and each of the pawls has an engaging end surface which can engage a respective one of the edge surfaces of the groove in the drive shaft; and wherein when the engaging end surface of each of the pawls is engaging the corresponding edge surface in the groove in the drive shaft, the engaging end surfaces of both of the pawls and also both edge surfaces of the groove in the drive shaft extend approximately parallel to a line connecting the two pivot axes of the pawls, and the pawls each have a portion extending from the pivot axis therefor to the engaging end surface thereof in a direction approximately tangentially with respect to an outer surface of the drive shaft.

5. A driving coupling of a rotational dobby according to claim 1, including spring means for resiliently urging movement of the pawls into engagement with the groove in the drive shaft, the spring means including a tension spring which connects the pawls.

6. A driving coupling of a rotational dobby according to claim 1, wherein the swivel axle includes a catching part, wherein the two catch openings are each symmetric with respect to a centerline of the connecting rod extending through the axis of the drive shaft and are provided on the connecting rod, and wherein the catch openings can each receive and hold the catching part of the swivel axle of the toggle-lever joint to thereby prevent the eccentric ring from rotating simultaneously with the drive shaft.

7. A driving coupling of a rotational dobby according to claim 6, wherein each of the catch openings has two boundary surfaces which diverge with respect to each other in a direction toward the swivel axle of the toggle-lever joint.

8. A driving coupling of a rotational dobby according to claim 7, wherein the catching part is circular and the distance between the boundary surfaces of each catch opening at an end thereof nearest the swivel axle of the toggle-lever joint is larger than the diameter of the catching part of the swivel axle of the toggle-lever joint.

9. A driving coupling of a rotational dobby according to claim 7, wherein the catch means includes members which have thereon the boundary surfaces of the catch openings and are supported resiliently.

10. A driving coupling of a rotational dobby according to claim 6, wherein the connecting rod has therein a bearing opening in which the eccentric ring is rotatably supported, wherein the catch means includes arcuate guide rails which are each supported on the connecting rod, extend concentrically along an edge of the bearing opening in the connecting rod, and radially overlap the eccentric ring along at least a portion of the length thereof.

11. A driving coupling of a rotational dobby according to claim 1, wherein the two pawls, the toggle-lever joint, and the catch openings are arranged symmetrically with respect to a centerline of the connecting rod which extends radially through the center of the drive shaft.

12. A driving coupling of a rotional dobby according to claim 1, wherein a sliding part which engages the controlling cam of the indexing ring is provided on the swivel axle of the the toggle-lever joint.

13. A driving coupling of a rotational dobby according to claim 1, including spring means for resiliently urging movement of the pawls into engagement with the groove in the drive shaft, the spring means including a leaf spring which acts onto one of the pawls and is supported on the eccentric ring.

14. A driving coupling of a rotational dobby according to claim 1, wherein the swivel axle includes a catching part, wherein the two catch openings are each symmetric with respect to a centerline of the connecting rod which extends through the axis of the drive shaft and are provided on a housing, and wherein the catch openings can each receive and hold the catching part of the swivel axle of the toggle-lever joint to thereby prevent the eccentric ring from rotating simultaneously with the drive shaft.

15. A rotational dobby, comprising a rotatably supported drive shaft having a groove therein, an eccentric ring which is of circular shape and has therethrough an eccentrically positioned opening which freely rotatably receives said drive shaft therethrough, a connecting rod having a circular opening therethrough in which said eccentric ring is freely rotatably supported, means for operatively coupling said connecting rod to a heddle frame of a weaving machine, two pawls which are each supported on said eccentric ring for pivotal movement about a respective pivot axis extending substantially parallel to said drive shaft, and a toggle joint which includes two plate members having first ends coupled to each other by a swivel axle extending substantially parallel to said drive shaft, wherein a second end of each said plate member remote from said first end thereof is pivotally coupled to a respective said pawl at a location spaced radially from the pivot axis of such pawl, including means for effecting movement of said swivel axle of said toggle joint in directions approximately radially of said drive shaft between a first position in which said plate members extend outwardly from said swivel axle in diametrically opposite directions and a second position in which said plate members form a angle with respect to each other, including means for preventing rotation of said eccentric ring when said swivel axle is in said second position, wherein each said pawl has an engaging end thereon at a location spaced radially outwardly from the pivot axis thereof, wherein as the swivel axle of the toggle joint is moved from its second to its first position said plate members effect pivotal movement of said pawls in a direction causing said engaging end of each said pawl to move from a location spaced from said drive shaft to a position engaging said groove in said drive shaft, and wherein said engaging ends of said pawls can simultaneously engage said groove in said drive shaft at angularly spaced locations therein.

16. The rotational dobby according to claim 15, wherein said means for preventing rotation of said eccentric ring includes means provided on said connecting rod and defining catch opens on diametrically opposite sides of said opening in said connecting rod, and includes a catching part which is provided on said swivel axle and is disposed in a respective said catch opening when said swivel axle is in said second position, movement of said swivel axle from said second to said first position being movement in a direction toward said drive shaft.

* * * * *

UNITED STATES PATENT AND TRADEMARK OFFICE
CERTIFICATE OF CORRECTION

PATENT NO. : 4 730 641

DATED : March 15, 1988

INVENTOR(S) : Rudolf Schwarz

It is certified that error appears in the above-identified patent and that said Letters Patent is hereby corrected as shown below:

Column 9, line 8; delete "and are provided on a housing".

Column 10, line 5; change "a" to ---an---.

Signed and Sealed this

Sixteenth Day of May, 1989

Attest:

DONALD J. QUIGG

Attesting Officer

Commissioner of Patents and Trademarks